United States Patent
Konno et al.

(10) Patent No.: US 8,430,774 B2
(45) Date of Patent: Apr. 30, 2013

(54) SANDWICH-MOLDED PART FOR TRANSMISSION DEVICE

(75) Inventors: Masahiko Konno, Iruma (JP); Sadahiko Yamaguchi, Tokyo (JP); Tatsumi Murohoshi, Kawasaki (JP)

(73) Assignees: Tsubakimoto Chain Co., Osaka (JP); Asahi Kasei Chemicals Corporation, Tokyo (JP)

( * ) Notice: Subject to any disclaimer, the term of this patent is extended or adjusted under 35 U.S.C. 154(b) by 536 days.

(21) Appl. No.: 11/631,484

(22) PCT Filed: Jul. 1, 2005

(86) PCT No.: PCT/JP2005/012190
§ 371 (c)(1),
(2), (4) Date: Jan. 4, 2007

(87) PCT Pub. No.: WO2006/004034
PCT Pub. Date: Jan. 12, 2006

(65) Prior Publication Data
US 2008/0032836 A1    Feb. 7, 2008

(30) Foreign Application Priority Data
Jul. 5, 2004   (JP) .................................. 2004-197606

(51) Int. Cl.
*F16H 7/18*   (2006.01)
(52) U.S. Cl.
USPC .......................................... 474/140; 474/111
(58) Field of Classification Search .................. 474/111, 474/140
See application file for complete search history.

(56) References Cited

U.S. PATENT DOCUMENTS

| | | | | |
|---|---|---|---|---|
| 6,634,974 | B2 * | 10/2003 | Fujiwara et al. | 474/111 |
| 2002/0042315 | A1 * | 4/2002 | Poiret | 474/111 |
| 2002/0193192 | A1 * | 12/2002 | Inoue et al. | 474/111 |
| 2004/0058763 | A1 * | 3/2004 | Konno | 474/111 |
| 2005/0096167 | A1 * | 5/2005 | Konno et al. | 474/111 |

FOREIGN PATENT DOCUMENTS

| | | |
|---|---|---|
| JP | 08-254253 | 10/1996 |
| JP | 09-052256 | 2/1997 |
| JP | 10-202694 | 8/1998 |

(Continued)

OTHER PUBLICATIONS

Thomas M. Roder "Importance of Moisture" incorporated as pp. 171-173 of "The Nylon Plastics Handbook", Melvin I. Kohan editor, Hanser Publishers, 1995.*
German Office Action for related German Patent Application No. 11 2005 001 448.7, issued on Dec. 21, 2010.

(Continued)

*Primary Examiner* — Michael R Mansen
*Assistant Examiner* — Robert T Reese
(74) *Attorney, Agent, or Firm* — Staas & Halsey LLP

(57) ABSTRACT

A sandwiched-molded part for a transmission apparatus has a slide rail body and a rail support body. A chain runs in slidable contact with the slide rail body. The molded part has a first resin forming a surface layer. The first resin has NYLON (66) as a main component. The melt viscosity of the first resin at a temperature of 300° C. is 500 Pa·s to 2000 Pa·s at a shear rate of $1000\ s^{-1}$. A second resin forms a core layer of the molded part and has a bending strength higher than that of the first resin. The wall thickness of the surface layer of the sliding part of the slide rail body is 1.0 mm or more.

21 Claims, 4 Drawing Sheets

FOREIGN PATENT DOCUMENTS

| | | |
|---|---|---|
| JP | 10-211633 | 8/1998 |
| JP | 2001-300979 | 10/2001 |
| JP | 2002-372111 | 12/2002 |
| JP | 2004-167801 | 6/2004 |

OTHER PUBLICATIONS

Richard Vieweg et al., "Polyamide," Kunststoff-Handbuch, Band VI, Carl Hanser Verlag Munchen, 1966, 9 pages.

* cited by examiner

SANDWICH-MOLDED PART FOR TRANSMISSION DEVICE

CROSS REFERENCE TO RELATED APPLICATIONS

This application is based on and hereby claims priority to PCT Application No. PCT/JP2005/012190 filed Jul. 1, 2005 and Japanese Application No. 2004-197606 filed Jul. 5, 2004, the disclosures of which are hereby incorporated herein by reference.

TECHNICAL FIELD

The present invention relates to a plastic guide for a transmission device which is used for a transmission device, such as a chain in an automobile engine, that transmits power by a power transmission medium, and more particularly used as a fixed guide or a movable guide to guide or stretch the power transmission medium while causing it to travel in a sliding contact state.

BACKGROUND ART

Generally, a transmission device for an automobile engine and the like to perform power transmission by the power transmission medium such as a chain has a guide for the transmission device, such as a fixed guide or a movable guide, to perform sliding of the power transmission medium attached to a body frame such as an engine block wall with bolts or the like. The movable guide such as a tensioner lever or the like used for such a transmission device applies appropriate transmitting tension to the power transmission medium in order to prevent transmission failure due to excess stretching or excess loosening of the circulation-traveling power transmission medium. And, the fixed guide such as a guide rail limits the circulation-traveling power transmission medium to a predetermined path of travel in order to prevent the power transmission medium from producing vibration noise and to prevent sideward vibration and disengagement.

FIG. 4(a) is a front view, and FIG. 4(b) is a sectional view taken along line A-A of FIG. 4(a), showing a conventional plastic guide (a tensioner lever) for a transmission device. This plastic guide 40 for a transmission device is formed of a single synthetic resin as a movable guide for a transmission device having a chain as the power transmission medium, and comprised of a slide rail 41, which is in slide contact with a traveling chain C, and a rail support 42. And, the rail support 42 is formed to have a boss portion 42a having a mounting hole 43 which serves to attach to an engine block wall and functions as a movable guide, a tensioner abutting portion 42b which abuts a tensioner (not shown) for applying appropriate tension to the chain, and reinforcing ribs 42c which serve to reinforce and also to reduce the weight.

But, the conventional plastic guide 40 for a transmission device is integrally formed of a single synthetic resin, so that it is hard to keep at a high level both of the sliding contact property and wear resistance that the slide rail 41, with which the chain C is in sliding contact, is required to possess and the strength property that the rail support 42 supporting the slide rail 41 is required to possess. For example, when the plastic guide 40 for a transmission device is formed of only plastic having an excellent sliding contact property and wear resistance, there are disadvantages that mechanical strength is poor, and if a section size is increased in order to compensate for the lack of the strength, the guide has an increased thickness to have a large size, and the space occupied by the guide when it is attached to the engine block wall becomes large.

As a plastic guide for a transmission device which remedies the above-described problems, there is, for example, Patent Literature 1 that proposes a sandwich-molded guide for a transmission device, wherein a slide rail is formed of a material having as the principal component a first high polymer material having wear resistance and heat resistance, and a rail support is formed of a material having as the principal component a second high polymer material having a strength higher than that of the material having as the principal component the first high polymer material. And, the slide rail and the rail support are integrally formed in an intimately joined state to each other by injection molding by a sandwich molding process, and the surface layer portions of the slide rail and the rail support are fully coated with the material having the first high polymer material as the principal component.
[Patent Literature 1]
Japanese Patent Laid-Open Publication No. 2002-372111

SUMMARY OF THE INVENTION

Problems to be Solved by the Invention

A plastic guide used for a transmission device of an automobile engine is required to have wear resistance against a slide rail on which a power transmission medium such as a chain slides in contact with it. As a result of a research performed by the present inventor about a degree of wear of the slide rail on the plastic guide for a transmission device through normal use, there was observed wear of about several tenth of a millimeter. Therefore, it is necessary that about 1 mm of the surface layer of the slide rail is formed of a material excelling in wear resistance in order to assure the safety sufficiently.

The guide for a transmission device produced by the sandwich molding described in Patent Literature 1 uses the material which has as the principal component the first high polymer material (polyamide resin) having excellent wear resistance for the slide rail required to have wear resistance, and the material which has as the principal component the second high polymer material having long fibrous or granular inorganic material or the like contained in a dispersed form and having excellent strength for the mechanical rail support required to have strength. They are fused to be integrally joined by the sandwich molding method, so that the wear resistance possessed by the material having the first high polymer material as the principal component and the high strength property possessed by the material having the second high polymer material as the principal component act in a mutually complementary manner. Thus, it has a noteworthy structure that the guide can be molded easily by means of a single mold without using a complex mold and production process.

But, the ordinary polyamide resin used for the above-described molded guide for a transmission device has a relatively low melt viscosity, so that where the above-described guide for a transmission device is molded by the sandwich molding method, the skin layer tends to have an insufficient thickness. Therefore, the skin layer is worn gradually when the guide is in practical use, and the core layer formed of the second high polymer material having poor wear resistance is revealed, possibly lowering suddenly the endurance of the guide for a transmission device of an automobile engine or the like.

The present invention has been made in view of the above circumstances and provides a sandwich-molded part for a transmission device that has an excellent sliding contact property and wear resistance along the entire region of the sliding contact surface of the power transmission medium such as a chain and also has excellent mechanical strength, capable of effectively preventing the endurance from lowering during the practical use.

Means for Solving the Problems

The sandwich-molded part for a transmission device of the present invention made to achieve the above-described object is a sandwich-molded part for a transmission device comprising a slide rail on which a chain slides and a rail support which is integrally provided along with the slide rail, wherein a first resin material forming a surface layer (skin layer) has nylon 66 as the principal component, and the melt viscosity of the first resin material at 300° C. is 300 Pa·s or more and 2000 Pa·s or less at a shear rate of 1000 s-1; a second resin material forming a core layer has a strength higher than that of the first resin material: and the surface layer (skin layer) on the entire region (surface with which the chain is in sliding contact) of the sliding contact surface of the slide rail has a thickness of 1.0 mm or more.

Effects of the Invention

According to the present invention, the sandwich-molded part for a transmission device having excellent sliding contact property and wear resistance along the entire region of the sliding contact surface of the power transmission medium such as a chain and also excellent mechanical strength, and capable of effectively preventing the endurance from lowering during a period of ordinary use is realized. And, the injection molding is performed using a single metal mold by the sandwich molding method, so that the individual processes of molding the slide rail, molding the rail support, and joining the slide rail and the rail support can be performed by a single process, and the manufacturing cost can be reduced considerably.

BRIEF DESCRIPTION OF THE DRAWINGS

FIG. 2 FIG. 2(a) is a plan view.

FIG. 4 FIG. 4(a) is a front view and FIG. 4(b) is a sectional view taken along line A-A of FIG. 4(a) showing a conventional plastic guide for a transmission device.

Figure 1:
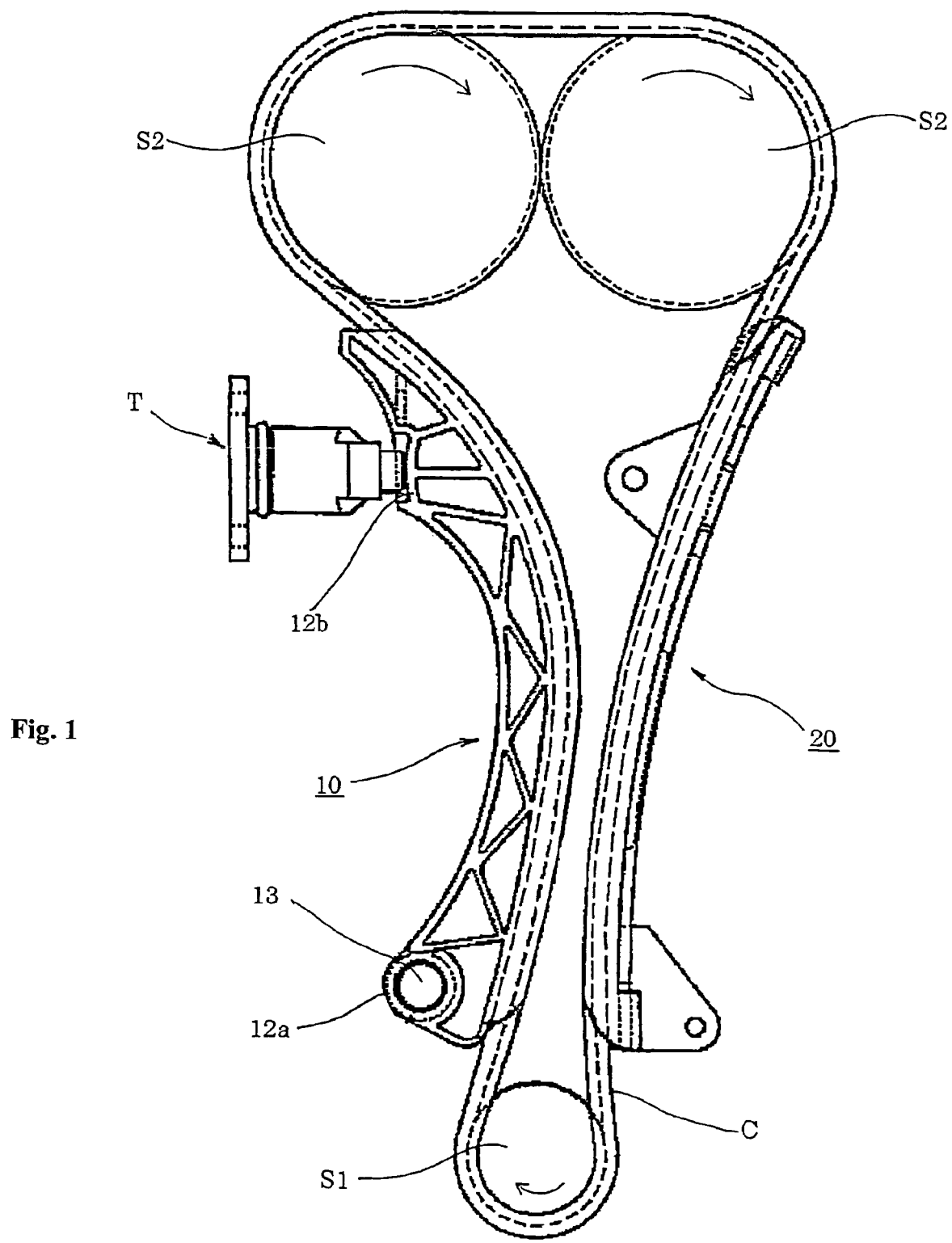
FIG. 1 A diagram illustrating a use mode of a sandwich-molded part for a transmission device according to one embodiment of the invention.

| [Description of Reference Numerals] | |
|---|---|
| 10 | Sandwich-molded part for transmission device |
| 11 | Slide rail |
| 11a | Chain-sliding contact surface |
| 12 | Rail support |
| 12a | Boss portion |
| 12b | Tensioner abutting portion |
| 12c | Reinforcing ribs |
| 13 | Mounting hole |
| 20 | Guide for transmission device (fixed guide) |
| 31 | Surface layer (skin layer) |
| 32 | Core layer |

-continued

| [Description of Reference Numerals] | |
|---|---|
| 40 | Plastic guide for transmission device |
| 41 | Slide rail |
| 42 | Rail support |
| 42a | Boss portion |
| 42b | Tensioner abutting portion |
| 42c | Reinforcing ribs |
| 43 | Mounting hole |

BEST MODE FOR CARRYING OUT THE INVENTION

The molded part for a transmission device according to the invention is molded by a so-called sandwich molding method. The sandwich molding method is a method of producing a two-layer molded product which is comprised of a surface layer (skin layer) formed of the first resin material and a core layer formed of the second resin material by performing injection molding of molten first and second resin materials in a mold having a shape similar to the contour of the molded part with prescribed timing, and a known injection molding machine for sandwich molding can be used.

Embodiments of the invention will be described with reference to FIG. 1 through FIG. 3.

Figure 2A:
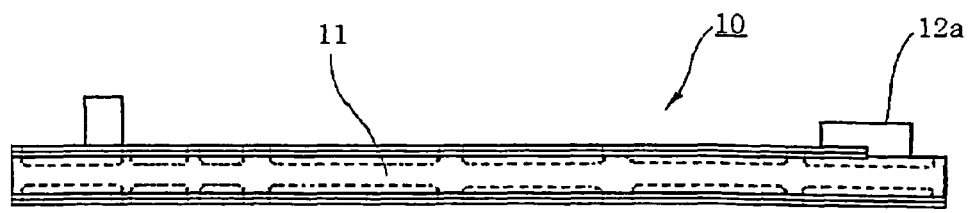
Figure 2B:
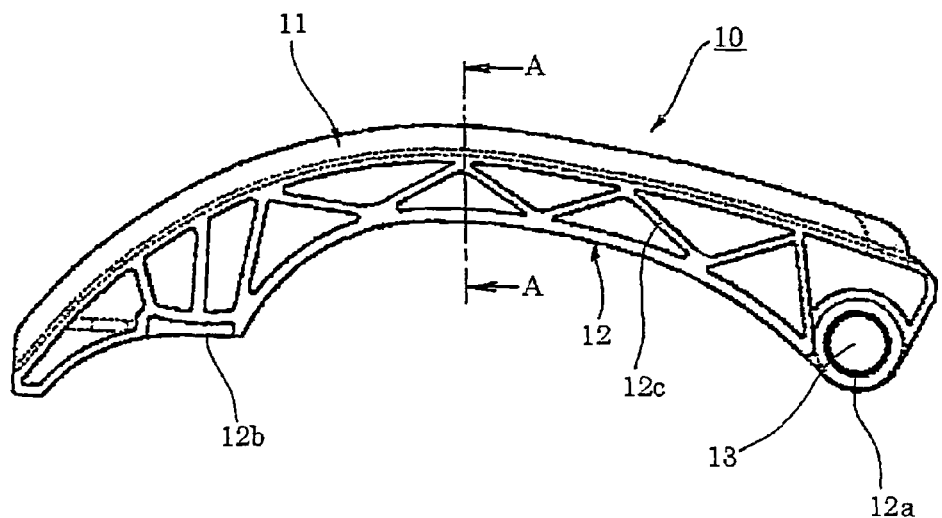
FIG. 2(b) is a front view and FIG. 2(c) is a bottom view, showing a sandwich-molded part for a transmission device according to one embodiment of the invention.
Figure 2C:
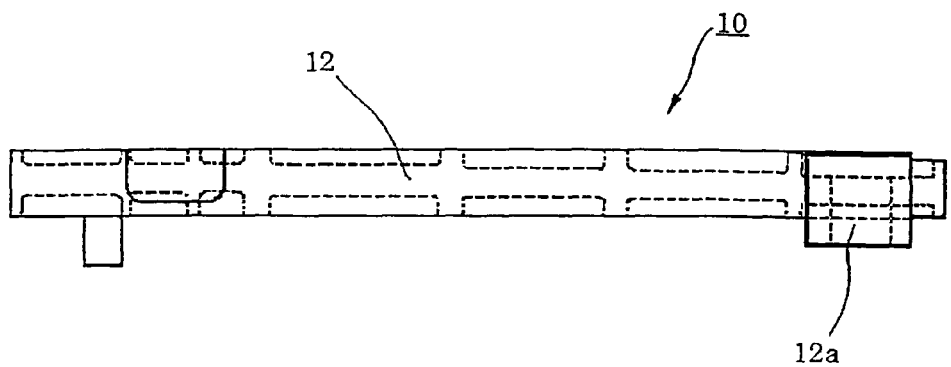

FIG. 1 is a diagram illustrating a use mode of a sandwich-molded part for a transmission device according to this embodiment. FIG. 2(a) is a plan view, FIG. 2(b) is a front view, and FIG. 2(c) is a bottom view, showing the sandwich-molded part for a transmission device. FIG. 3 is a sectional view taken along line A-A of FIG. 2.

As shown in FIG. 1, a sandwich-molded part 10 for a transmission device of this embodiment is used within an automobile engine, that transmits power by a chain C which travels to circulate around a driving sprocket S1 and a driven sprocket S2, to serve as a movable guide that guides or applies tension to the chain C while causing it to travel in a sliding state. Reference numeral 20 is a guide (fixed guide) for a transmission device.

The sandwich-molded part 10 for the transmission device is comprised of a substantially arc-shaped slide rail 11 having a chain-sliding contact surface 11a with which the circulation traveling chain C is in slide contact and a rail support 12 which is disposed to extend in a longitudinal direction on the back surface of the slide rail 11 as shown in FIG. 2. Besides, this rail support 12 has a boss portion 12a having a mounting hole 13 which is attached to an engine block wall and functions as a movable guide, a tensioner abutting portion 12b which abuts a tensioner T that prevents a transmission failure resulting from excess stretching or excess loosening of the circulation traveling chain C and applies appropriate tension to the chain, and reinforcing ribs 12c that serve for reinforcement and minimization of its weight.

Figure 3:
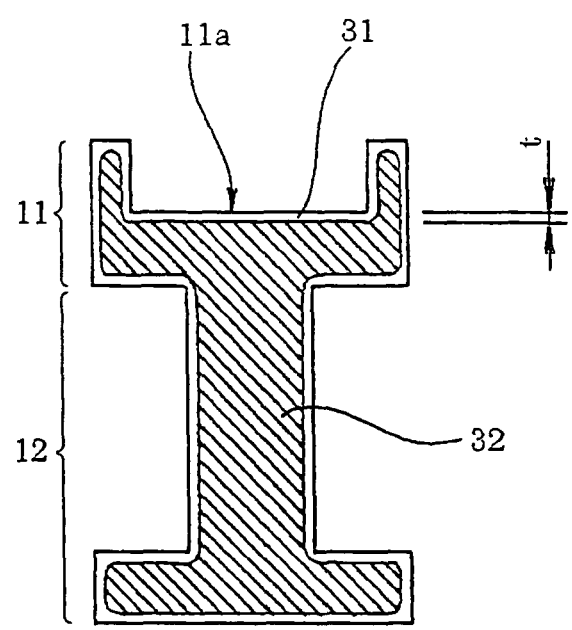
FIG. 3 A sectional view taken along line A-A of FIG. 2.
Figure 4A:
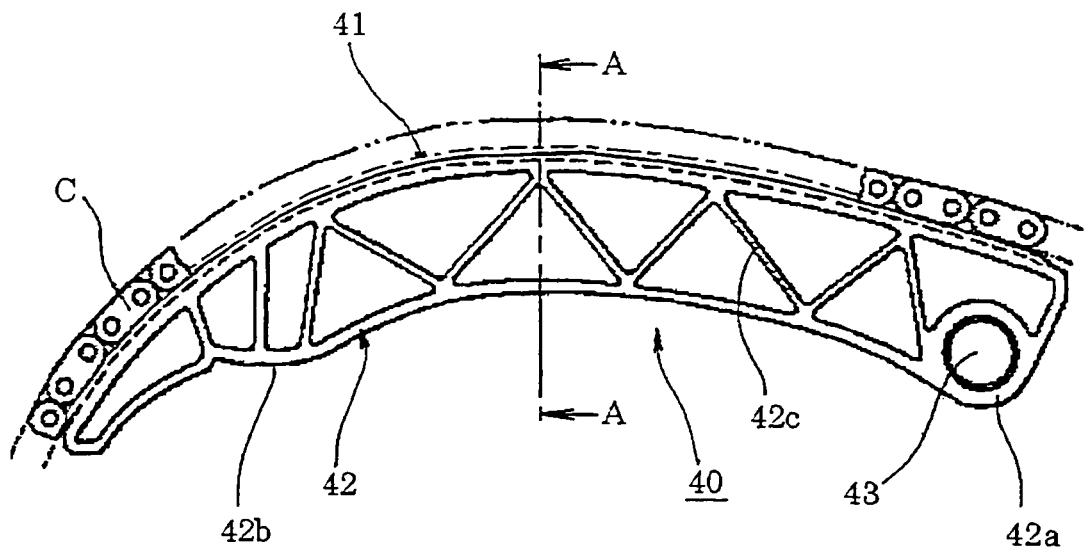
Figure 4B:
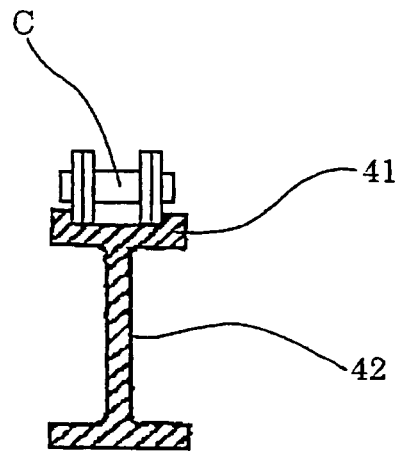

The sandwich-molded part 10 for the transmission device is a two-layered molded product which is comprised of a surface layer (skin layer) 31 formed of a first resin material and a core layer 32 formed of a second resin material as shown in FIG. 3.

For the first resin material forming the skin layer 31, a material mainly consisting of nylon 66 excelling in wear resistance is used. Especially, it is significant that this first resin has melt viscosity at 300° C. of 300 Pa·s or more and 2000 Pa·s or less (more preferably 500 Pa·s or more and 1500 Pa·s or less) at a shear rate of 1000 s-1. Especially, the provision of this melt viscosity can realize the skin layer 31 having thickness of 1.0 mm or more along the entire region of the sliding contact surface 11a (the surface on which the chain slides) of the slide rail 11 and also a two-layered molded product, which is surely reinforced by the second resin material forming the core layer 32.

If the melt viscosity is less than 300 Pa·s, the thickness of 1.0 mm or more of the skin layer 31 cannot be realized along the entire region of the sliding contact surface, and the molded part is worn gradually in a period of practical use to reveal the core layer 32 having poor wear resistance, resulting in sharp lowering of the endurance of the guide part for a transmission device of an automobile engine or the like. Even if the injection amount of the first resin material which becomes the skin layer 31 is increased, a flow end side (region away from the gate) is easily formed of the first resin material only, and the formation of the core layer 32 of the second resin material is disturbed, so that sufficient mechanical strength cannot be obtained. Meanwhile, if the melt viscosity exceeds 2000 Pa·s, defective molding is readily caused because of short shot.

To the first resin material may be added a heat resistance improver (heat stabilizer), an oxidation inhibitor, a mold release agent, a coloring agent and the like, if necessary.

The heat resistance improver is not particularly limited, but halogen metal salts and first transition series metal compounds can be used preferably.

The halogen metal salt is a salt of halogen and a metal element of group 1 or 2 of the periodic table, and preferably, potassium iodide, potassium bromide, potassium chloride, sodium iodide, sodium chloride or the like or a mixture thereof. And, potassium iodide is most desirable among them.

The first transition series metal compounds are compounds of the first transition series metals (11 group) of the periodic table, and preferably a metal compound of copper element (Cu). Examples include halide, sulfate, acetate, propionate, benzoate, adipate, terephthalate, salicylate, nicotinate and stearate of copper, chelate compounds such as ethylenediamine and ethylenediaminetetraacetate, or a mixture thereof. Among them, preferred are copper iodide, cuprous bromide, cupric bromide, cuprous chloride, and copper acetate.

As the oxidation inhibitor, for example, generally used sodium phosphate, and hindered phenol-based and amine-based oxidation inhibitors are used.

As the mold release agent, polyethylene glycol, higher fatty acid metal salt and the like used for ordinary polyamide resins are used.

The first resin material (polyamide) having nylon 66 having viscosity of the invention as the principal component is known, but the material having this range of viscosity is generally used for extrusion molding, and it is often that a plasticizer and a mold release agent are not blended. A preferable combination of a plasticizer and a mold release agent suitable for the sandwich molding is 0.005 to 0.1 weight parts of higher fatty ester having an acid number of 5 to 50 (mg KOH/g) and a saponification value of 50 to 200 (mg KOH/g) and 0.01 to 0.1 weight parts (100 weight parts of nylon 66) of higher fatty ester. To avoid a "baking" phenomenon of the resin at the time of the sandwich molding, it is desirable to add 0.005 to 0.1 weight part (100 weight parts of nylon 66) of an organic heat stabilizer selected from hindered phenols. It is desirable that pellets also used when molding contain 0.02 to 0.08% by weight of a water content. If the water content is excessively large, the viscosity lowers when molding, and it is difficult to obtain a molded product having a target thickness. Meanwhile, if the water content is excessively small, the baking phenomenon tends to occur. Thus, it is possible to secure the thickness of the molded product with the above range and to remedy the baking phenomenon by adjusting to the above-described range.

Examples of the coloring agent include pigments such as carbon black, titanium white and metallic pigments, and a variety of dyes.

Besides, the first resin material can contain flame retardants such as antimony trioxide, aluminum hydroxide, magnesium hydroxide, zinc borate, zinc stannate, zinc hydroxystannate, ammonium polyphosphate, melamine cyanurate, succinoguanamine, melamine polyphosphate, melamine sulfate, melamine phthalate, aromatic polyphosphate and composite glass powder, various types of plasticizers, moldability improvers, weatherability improvers, antistatic agents and various other additives.

For the second resin material forming the core layer 32, a material having a bending strength higher than that of the first resin material is used. It is preferable on the points that the second resin material is a material having a chemical affinity for the first resin material, which has nylon 66 as the principal component, and substantially the same shrinkage characteristics as those of the first resin material, and they are fused with each other at the boundary region at the time of the sandwich molding, so that they are intimately joined. Specifically, the second resin material has, for example, a general reinforcing material such as glass fibers, mica, talc, wollastonite or the like dispersed into a material such as polyamide resin selected from nylon 6, nylon 66, nylon 46, all aromatic nylons and the like. The reinforcing material is contained in an amount of 5 to 60% by weight, and preferably 30 to 50% by weight. It is preferable that the second resin material has substantially the same melt viscosity as that of the first resin material.

The second resin material may also contain the same heat resistance improver (heat stabilizer), oxidation inhibitor, mold release agent, coloring agent and the like as those described above, if necessary.

The sandwich-molded part for a transmission device of the invention is molded by first injecting the first resin from a sandwich nozzle of the injection molding machine for a sandwich molding into a mold having a hollow shaped in correspondence with the outer shape of the molded part and injecting the second resin with appropriate timing. Thus, the skin layer 31 formed of the first resin having wear resistance and the core layer 32 formed of the second resin having a high strength property are integrally joined to each other in a complete fused state.

EXAMPLES

Examples of the invention will be described below, but it should be noted that the invention is not limited to the following Examples.

Examples 1 to 3, Comparative Examples 1 to 4

As shown in FIG. 2, a sandwich-molded part (overall length of 200 mm) for a transmission device was sandwich-molded as described below.
(First Resin Material)
As a first resin material forming the skin layer, the following samples 1 to 4 having nylon 66 of Asahi Kasei Chemicals as the principal component were used.
Sample 1 (grade 1300): Melt viscosity of 100 Pa·s, bending strength of 110 MPa
Sample 2: Melt viscosity of 600 Pa·s, bending strength of 110 MPa Sample 3: Melt viscosity of 1800 Pa·s, bending strength of 110 MPa Sample 4: Melt viscosity of 2500 Pa·s, bending strength of 110 MPa To the samples were added 0.05% by weight of aluminum stearate as a moldability improver and 0.03% by weight of PEG (polyethylene glycol) as a spreading agent.

For the melt viscosity, melt viscosity was measured according to ISO 11443 at 300° C. and a shear rate of 1000 s-1.

(Second Resin Material)

As the second resin material forming the core layer, nylon 66 (grade 14G33: bending strength of 325 MPa, 14G50: bending strength of 390 MPa) containing glass fibers (GF) and manufactured by Asahi Kasei Chemicals was used. A black-colored part having 0.05% by weight of carbon black combined as a black coloring agent was used so that the thickness of the skin layer could be measured.

(Mold)

A guide mold having the slide rail and the rail support integrated was used. The resin gate was disposed near the end (right upper part of the mounting hole 13 in FIG. 2(*a*)) in a longitudinal direction of the slide rail.

(Molding Conditions)

Using a molding machine FS80 produced by Nissei Plastic Industrial Co., Ltd., both first and second resin materials were sandwich-molded under conditions of an injection velocity of 20 cc/sec, a cylinder temperature of 290° C. and a mold temperature of 80° C. by injecting first the first resin material, then the second resin material, and then the first resin material again.

(Method of Measuring Skin Layer Thickness)

The obtained molded product was cut at a part 2 cm from the gate, the center part and a part 2 cm from the flow end. The skin layer of the chain-sliding contact surface 11*a* of the slide rail 11 was measured for the thickness with reference to magnified photographs of 10 times of the cross-sectional surfaces.

(Test Method of Static Breakdown Strength)

The obtained molded product was tested whether or not it was broken by applying a load of 20 kN from above the cross-sectional surface taken along line A-A of FIG. 2.

The combination of the first resin material and the second resin material in Examples 1 to 3 and Comparative Examples 1 to 4, the measured results of the skin layer thickness t of the chain-sliding contact surface 11*a* (see FIG. 3) and the test results of the static breakdown strength are collectively shown in Table 1.

ity at 300° C. of 300 Pa·s or more and 2000 Pa·s or less at a shear rate of 1000 s-1 as a first resin material forming a skin layer have the skin layer thickness of 1 mm or more of the chain-sliding surface along the overall length of the slide rail. Therefore, the sandwich-molded parts have excellent sliding contact property and wear resistance on the entire area of the sliding contact surface, the core layer formed of the second resin material having poor wear resistance is not revealed during the actual use, and the endurance is excellent when used as a guide for a transmission device of an automobile engine or the like.

Meanwhile, if the melt viscosity of the first resin material is excessively low (Comparative Examples 1, 2), the skin layer has a thickness of 1.0 mm or more on the side of a flow end, but the skin layer having a thickness of 1.0 mm or more cannot be realized along the entire area of the sliding contact surface. And, if the first resin material has an excessively high melt viscosity (Comparative Example 3), the mold reproducibility is poor, and molding is impossible.

The invention claimed is:

1. A sandwich-molded part for a transmission device, the sandwich-molded part being molded by a sandwich molding method, the sandwich-molded part comprising:
    a slide rail on which a chain slides, the slide rail having a contact surface and guide portions extending away from the contact surface to define a travel path for the chain on the contact surface; and
    a rail support which is integrally provided along with the slide rail, wherein:
    the slide rail and the rail support are formed from a surface layer and a core layer;
    the core layer constituting the slide rail and the core layer constituting the rail support are integrally formed;
    the surface layer is formed from nylon 66 which including additives has a prescribed melt viscosity at 300° C. of 300 Pa·s or more and 2000 Pa·s or less at a shear rate of 1000 s$^{-1}$;
    the core layer has a bending strength higher than that of the surface layer; and
    the surface layer on the entire contact surface of the slide rail has a thickness of 1.0 mm or more.

2. The sandwich-molded part for a transmission device according to claim 1, wherein the core layer is formed from a resin material having nylon as the principal component.

3. The sandwich-molded part for a transmission device according to claim 2, wherein the surface layer comprises the following additives:

TABLE 1

| | First resin | | Second resin | | Skin layer thickness (mm) | | | Static breakdown strength |
|---|---|---|---|---|---|---|---|---|
| | Sample name | Melt viscosity | Sample name | GF amount | Gate | Center | End | |
| Example 1 | Sample 2 | 600 Pa·s | 14G50 | 50% | 1.08 | 1.13 | 1.30 | 20 kN or more |
| Example 2 | Sample 3 | 1800 Pa·s | 14G50 | 50% | 1.32 | 1.41 | 1.23 | 20 kN or more |
| Example 3 | Sample 2 | 600 Pa·s | 14G33 | 33% | 1.04 | 1.16 | 1.28 | 20 kN or more |
| Comp. Exam. 1 | Sample 1 | 100 Pa·s | 14G50 | 50% | 0.65 | 0.82 | 1.20 | 20 kN or more |
| Comp. Exam. 2 | Sample 1 | 100 Pa·s | 14G33 | 33% | 0.62 | 0.78 | 1.25 | 20 kN or more |
| Comp. Exam. 3 | Sample 4 | 2500 Pa·s | 14G50 | 50% | Unmoldable | | | — |
| Comp. Exam. 4 | Sample 2 | 600 Pa·s | Sample 2 | 0% | 1.04 | 1.11 | 1.16 | Less than 20 kN |

As shown in Table 1, the sandwich-molded parts (Examples 1 to 3) for a transmission device according to the present invention using the materials having the melt viscos- 0.005 to 0.1 parts by weight based on 100 parts by weight of the nylon 66 having the prescribed melt viscosity, of a first higher fatty acid ester having an acid number of 5 to 50 (mg/g) and a saponification value of 50 to 200 (mg/g); and 0.01 to 0.1 parts by weight based on 100 parts by weight of the nylon 66 having the prescribed melt viscosity, of a second higher fatty acid ester.

4. The sandwich-molded part for a transmission device according to claim 3, wherein the surface layer further contains 0.005 to 0.1 parts by weight based on 100 parts by weight of the nylon 66 having the prescribed melt viscosity, of an organic heat stabilizer, as an additive.

5. The sandwich-molded part for a transmission device according to claim 4, wherein the first resin material has a water content of 0.02 to 0.08% by weight.

6. The sandwich-molded part for a transmission device according to claim 1, wherein the core layer is formed from a resin material having nylon 66 as the principal component.

7. The sandwich-molded part for a transmission device according to claim 6, wherein the surface layer comprises the following additives:

0.005 to 0.1 parts by weight based on 100 parts by weight of the nylon 66 having the prescribed melt viscosity, of a first higher fatty acid ester having an acid number of 5 to 50 (mg/g) and a saponification value of 50 to 200 (mg/q); and 0.01 to 0.1 parts by weight based on 100 parts by weight of the nylon 66 having the prescribed melt viscosity, of a second higher fatty acid ester.

8. The sandwich-molded part for a transmission device according to claim 7, wherein the surface layer further contains 0.005 to 0.1 parts by weight based on 100 parts by weight of the nylon 66 having the prescribed melt viscosity, of an organic heat stabilizer, as an additive.

9. The sandwich-molded part for a transmission device according to claim 8, wherein the first resin material has a water content of 0.02 to 0.08% by weight.

10. The sandwich-molded part for a transmission device according to claim 1, wherein the core layer is formed from a composite material having an inorganic material contained in nylon 66.

11. The sandwich-molded part for a transmission device according to claim 10, wherein the surface layer comprises the following additives:

0.005 to 0.1 parts by weight based on 100 parts by weight of the nylon 66 having the prescribed melt viscosity, of a first higher fatty acid ester having an acid number of 5 to 50 (mg/l) and a saponification value of 50 to 200 (mg/g); and 0.01 to 0.1 parts by weight based on 100 parts by weight of the nylon 66 having the prescribed melt viscosity, of a second higher fatty acid ester.

12. The sandwich-molded part for a transmission device according to claim 11, wherein the surface layer further contains 0.005 to 0.1 parts by weight based on 100 parts by weight of the nylon 66 having the prescribed melt viscosity, of an organic heat stabilizer, as an additive.

13. The sandwich-molded part for a transmission device according to claim 12, wherein the first resin material has a water content of 0.02 to 0.08% by weight.

14. The sandwich-molded part for a transmission device according to claim 1, wherein the surface layer comprises the following additives:

0.005 to 0.1 parts by weight based on 100 parts by weight of the nylon 66 having the prescribed melt viscosity, of a first higher fatty acid ester having an acid number of 5 to 50 (mg/g) and a saponification value of 50 to 200 (mg/g); and 0.01 to 0.1 parts by weight based on 100 parts by weight of the nylon 66 having the prescribed melt viscosity, of a second higher fatty acid ester.

15. The sandwich-molded part for a transmission device according to claim 14, wherein the surface layer further contains 0.005 to 0.1 parts by weight based on 100 parts by weight of the nylon 66 having the prescribed melt viscosity, of an organic heat stabilizer, as an additive.

16. The sandwich-molded part for a transmission device according to claim 15, wherein the first resin material has a water content of 0.02 to 0.08% by weight.

17. The sandwich-molded part for a transmission device according to claim 1, wherein the prescribed melt viscosity of the nylon 66 forming the surface layer is a melt viscosity at 300° C. of 500 Pa·s or more and 2000 Pa·s or less at a shear rate of 1000 s$^{-1}$.

18. The sandwich-molded part for a transmission device according to claim 1, wherein the core layer is present at the guide portions by molding with the sandwich molding method.

19. The sandwich-molded part for a transmission device according to claim 1, wherein the surface layer has a thickness of 1.0-1.41 mm.

20. A manufacturing method of a sandwich-molded part for a transmission device, comprising:

providing a mold having a shape similar to a contour of the sandwich-molded part;

providing nylon 66 having a prescribed melt viscosity at 300° C. of 300 Pa·s or more and 2000 Pa·s or less at a shear rate of 1000 s$^{-1}$;

providing a core resin material having a strength higher than that of the nylon 66 having the prescribed melt viscosity; and using a sandwich molding process to form a surface layer on the sandwich-molded part, the sandwich molding process comprising injecting into the mold with a prescribed timing interval therebetween, the core resin material and the nylon 66 having the prescribed melt viscosity, wherein the sandwich-molded part comprises a slide rail on which a chain slides and a rail support, the slide rail has a contact surface and guide portions extending away from the contact surface to define a travel path for the chain on the contact surface, the rail support is integrally formed with the slide rail, the surface layer on the slide rail and the rail support is formed from the nylon 66 having the prescribed melt viscosity, the core layer constituting the slide rail and the core layer constituting the rail support are integrally formed, and the surface layer on the entire contact surface of the slide rail has a thickness of 1.0 mm or more.

21. The manufacturing method according to claim 20, wherein the nylon 66 having the prescribed melt viscosity is injected concurrently with 0.02 to 0.08% by weight of water and additives comprising a fatty acid ester and an organic heat stabilizer.

* * * * *

UNITED STATES PATENT AND TRADEMARK OFFICE
CERTIFICATE OF CORRECTION

PATENT NO. : 8,430,774 B2  
APPLICATION NO. : 11/631484  
DATED : April 30, 2013  
INVENTOR(S) : Masahiko Konno et al.

Page 1 of 1

It is certified that error appears in the above-identified patent and that said Letters Patent is hereby corrected as shown below:

In the Claims

Column 8, Line 36 (Approx.), In Claim 1, delete "66" and insert -- 66, --, therefor.

Column 9, Line 24, In Claim 7, delete "(mg/q);" and insert -- (mg/g); --, therefor.

Column 9, Line 46, In Claim 11, delete "(mg/l)" and insert -- (mg/g) --, therefor.

Signed and Sealed this  
Thirteenth Day of August, 2013

Teresa Stanek Rea  
*Acting Director of the United States Patent and Trademark Office*